UNITED STATES PATENT OFFICE.

RICHARD HERZ, OF FRANKFORT-ON-THE-MAIN, AND WILHELM FROHNEBERG, OF FECHENHEIM, GERMANY, ASSIGNORS TO CASSELLA COLOR COMPANY, A CORPORATION OF NEW YORK.

FAST YELLOW SULFID DYESTUFFS.

1,100,877.  Specification of Letters Patent.  Patented June 23, 1914.

No Drawing.  Application filed February 21, 1913. Serial No. 749,847.

*To all whom it may concern:*

Be it known that we, RICHARD HERZ, Ph. D., a subject of the King of Prussia, and a resident of Eysseneckstrasse 17, Frankfort-on-the-Main, Germany, and WILHELM FROHNEBERG, Ph. D., a subject of the King of Prussia, and a resident of Langestrasse, Fechenheim, near Frankfort-on-the-Main, Germany, have invented certain new and useful Fast Yellow Sulfid Dyestuffs, of which the following is a full description.

We have found that if acetylated amino compounds of carbazole of the following general formula

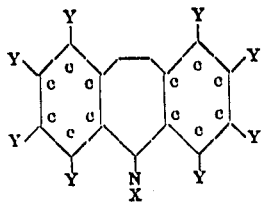

where X means: hydrogen, or alkyl, or aralkyl and Y means: hydrogen, or $NH.COCH_3$, or halogen, are heated with sulfur, preferably in presence of benzidin, tolidin or similarly acting substances at elevated temperatures, new sulfid colors result, which are distinguished by their fastness to chlorin. Especially valuable dyestuffs are produced from the halogen derivatives of the acetylated amino compounds.

The production of nitro- and amino-compounds of carbazole has already been described in literature (*vide* Beilstein, 3rd edition, volume 4, pages 891, 991, 1172). The hitherto unknown nitro- and amino-(N)-alkyl- and (N)-aralkylcarbazoles may be prepared in an analogous manner.

The halogen derivatives of the acetylated aminocarbazoles and (N)-alkylcarbazoles may be made by either of the two following general methods: Either the halogen may first be introduced into the nucleus of the carbazole, and the resulting halogen carbazoles then nitrated, reduced and acetylated, or the carbazole and its derivatives, substituted in the NH group, are first nitrated, then chlorinated or brominated and the nitro-halogen compounds thus produced are then reduced and acetylated by the usual methods. Two series of isomeric halogen derivatives of amino-, nitroamino- and diaminocarbazoles and (N)-alkylcarbazoles are obtained, which yield very valuable dyestuffs when heated with sulfur to high temperatures preferably in presence of benzidin.

The process of manufacture is illustrated by the following examples:

Example I: 100 kilos diacetyldiaminocarbazole (obtained by acetylating diaminocarbazole of the D. R. P. 46438), 200 kilos finely ground sulfur, 100 kilos benzidin are heated in the stove for a prolonged period for instance 10 to 14 hours to 180°–250° C. The melt, when cold, is finely powdered and digested with a concentrated solution of sodium sulfid crystals at 90°–120° C. until a test proves to be easily soluble in a dilute hot sodium sulfid solution. This dyestuff possesses a great tinctorial power, and dyes cotton yellow shades. Such dyeings are fast to washing, light and chlorin.

If in the above example the diacetyldiaminocarbazole is substituted by the same quantity of diacetyldiamino-(N)-alkylcarbazole (produced in an analogous manner from the (N)-alkylcarbazole as described in the D. R. P. 46438 from the carbazole), otherwise working as above described, products are obtained of very similar properties, but of a somewhat more reddish shade.

Example II: 50 kilos monoacetylmonoaminocarbazole (produced by acetylating 3-aminocarbazole), 50 kilos benzidin, 200 kilos sulfur are melted, and heated as described in Example I. Thus a dyestuff is obtained dyeing cotton from a sodium sulfid bath or from a hydrosulfite vat greenish-yellow shades.

Example III: 50 kilos nitroacetylaminocarbazole (obtained by partly reducing dinitrocarbazole to nitroaminocarbazole and acetylating the latter), 30 kilos benzidin, 200 kilos sulfur are heated for 10 hours in the stove to 200°–240° C. and then further treated as stated above. The resulting dyestuff dyes cotton greenish-yellow-olive shades.

When substituting the nitroacetylaminocarbazole by the corresponding compound of the (N)-ethylcarbazole, very similar dyestuffs may be obtained.

Example IV: 100 kilos of dichlordiacetyldiamino-carbazole (produced by nitrating, reducing and acetylating the dichlorcarbazole, described by Mazzara and Lamberti in the *Gaz. Chim.* 26, 2, page 240), 100 kilos of benzidin, 250 kilos of sulfur, are treated as described in Example I. The dyestuff produced dyes cotton directly greenish-yellow-olive shades, possessing excellent fastness to washing, light and bleaching. If in this example the dichlordiacetyldiaminocarbazole is replaced by the same amount of dichlordiacetyldiamino-(N)-ethylcarbazole, prepared in an analogous manner as above described, a similar coloring matter is obtained dyeing a somewhat more yellowish shade.

Example V: 50 kilos dichlordiacetyldiaminocarbazole (produced by acetylating the dichlordiaminocarbazole described by P. Ziersch in the *Reports of the German Chemical Society*, vol. 42, page 3799), 60 kilos benzidin, 200 kilos flowers of sulfur, are heated for a prolonged period, for instance 10 to 15 hours at 180°–230° C.; the melt is then treated as above described. The dyestuff produced dyes cotton in a sodium sulfid solution or in an alkaline hydrosulfite solution, yellow.

Example VI: 50 kilos of chloracetylamino-(N)-alkylcarbazole (produced by first mononitrating (N)-alkylcarbazole in a glacial acetic acid solution, and then thoroughly chlorinating the nitro body thus obtained, and finally reducing and acetylating it), 40 kilos benzidin, 180 kilos flowers of sulfur are heated and treated as described in the foregoing example. The dyestuff produced dyes cotton pure greenish-yellow shades of excellent fastness to washing and bleaching.

Having now particularly described and ascertained the nature of our said invention, and in what manner the same is to be performed, we declare that what we claim is:—

1. The process for the manufacture of fast yellow sulfur dyestuffs, which consists in heating with sulfur at elevated temperatures in the presence of benzidin acetylated amino compounds of carbazoles substantially as described.

2. The process for the manufacture of fast yellow sulfur dyestuffs, which consists in heating with sulfur at elevated temperatures in the presence of benzidin halogen derivatives of acetylated amino compounds of carbazoles substantially as described.

3. The process for the manufacture of fast yellow sulfur dyestuffs, which consists in heating with sulfur at elevated temperatures in the presence of benzidin acetylated amino compounds of carbazoles substituted in the imido group substantially as described.

4. The process for the manufacture of fast yellow sulfur dyestuffs, which consists in heating with sulfur at elevated temperatures in the presence of benzidin halogen derivatives of acetylated amino compounds of carbazoles substituted in the imido group substantially as described.

5. As new articles of manufacture the fast yellow sulfur dyestuffs derived from sulfur and acetylated amino compounds of carbazole being in a dry state yellow to orange powders, insoluble in water and the usual organic solvents, soluble in concentrated sulfuric acid with a reddish brown to a dark brown color, soluble in hot alkaline sulfid solution with an orange-brown color and dyeing vegetable fibers in an alkaline sulfid bath, or in the alkaline hydrosulfite vat yellow shades which are distinguished by their fastness to chlorin, substantially as described.

6. As new articles of manufacture the fast yellow sulfur dyestuffs derived from sulfur and the halogen derivatives of the acetylated amino compounds of carbazole being in a dry state yellow to orange powders, insoluble in water and the usual organic solvents, soluble in concentrated sulfuric acid with a reddish brown to a dark brown color, soluble in hot alkaline sulfid solution with an orange-brown color and dyeing vegetable fibers in an alkaline sulfid bath or in the alkaline hydrosulfite vat yellow shades which are distinguished by their fastness to chlorin, substantially as described.

7. As new articles of manufacture the fast yellow sulfur dyestuffs derived from sulfur and the acetylated amino compounds of carbazoles substituted in the imido group being in a dry state yellow to orange powders, insoluble in water and the usual organic solvents, soluble in concentrated sulfuric acid with a reddish-brown to a dark brown color, soluble in hot alkaline sulfid solution with an orange-brown color and dyeing vegetable fibers in an alkaline sulfid bath or in the alkaline hydrosulfite vat yellow shades which are distinguished by their fastness to chlorin, substantially as described.

8. As new articles of manufacture the fast yellow sulfur dyestuffs derived from sulfur and the halogen derivatives of the acetylated amino compounds of carbazoles, substituted in the imido group, being in a dry state yellow to orange powders, insoluble in water and the usual organic solvents, soluble in concentrated sulfuric acid with a reddish-brown to a dark brown color, soluble in hot alkaline sulfid solution with an orange-brown color and dyeing vegetable fibers in an alkaline sulfid bath or in the alkaline hydrosulfite vat yellow shades which are distinguished by their fastness to chlorin, substantially as described.

In witness whereof we have hereunto signed our names this 6th day of Feb., 1913, in the presence of two subscribing witnesses.

RICHARD HERZ, Ph. D.
WILHELM FROHNEBERG, Ph. D.

Witnesses:
JEAN GRUND,
CARL GRUND.